UNITED STATES PATENT OFFICE.

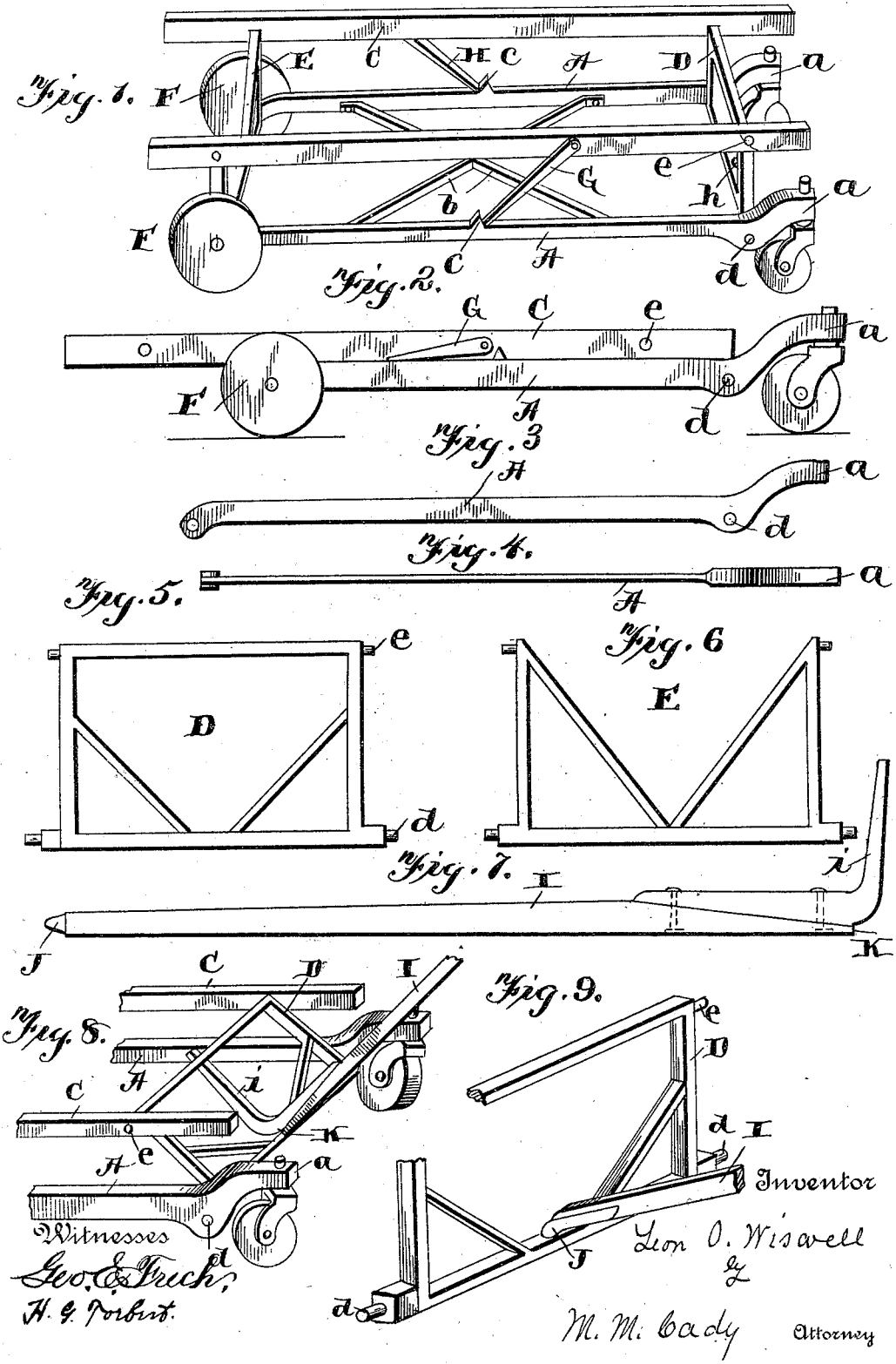

LEON O. WISWELL, OF NICHOLS, NEW YORK.

STOVE-TRUCK.

SPECIFICATION forming part of Letters Patent No. 554,386, dated February 11, 1896.

Application filed November 18, 1895. Serial No. 569,295. (No model.)

*To all whom it may concern:*

Be it known that I, LEON O. WISWELL, a citizen of the United States, residing at Nichols, in the county of Tioga and State of New York, have invented certain new and useful Improvements in Stove-Trucks; and I do hereby declare the following to be a full, clear, and exact description of the invention, such as will enable others skilled in the art to which it appertains to make and use the same.

My invention relates to hand-trucks for use more particularly in handling stoves, and one among the numerous objects is to adapt it to be run under stoves having very short legs, and when under to raise the stove for transportation.

Another object is to provide a handle which shall be removably attached and which shall serve both as a lever for raising the weight on the truck and as a tongue for propelling the truck.

These with numerous other minor objects will be fully described in the following specification and pointed out in the claims.

In the drawings forming a part of the specification, Figure 1 is a side elevation of the truck when the platform is in its highest position. Fig. 2 is a side view of the truck when closed down. Fig. 3 is a side view of one of the lower rails removed. Fig. 4 is a top view of the same. Fig. 5 is a side view of the forward crank. Fig. 6 is a side view of the rear crank. Fig. 7 is a side view of the tongue and lever combined. Fig. 8 shows mode in which the tongue is applied to raise the weight with the platform partly raised, and Fig. 9 shows the tongue in position for transporting the truck.

Like letters denote corresponding parts in all of the drawings.

The base of the truck consists of two side bars of iron A A, pivotally attached to the rear axle and bent upwardly near their front ends, as $a$, and sustained upon caster-wheels B B. Between the two side bars A A are straps $b\ b$.

The movable platform C of the truck is sustained upon two cranks D and E. The front crank, D, (shown in Fig. 5,) is pivoted in the two side bars A A at $d$, and also pivoted in the rails forming the platform C at $e$. The rear crank, E, (shown in Fig. 6,) is pivoted at its upper corners in the rails of the platform and at its lower ends it is formed into the axle X for the wheels F F. Both of these cranks D and E are made of iron or other suitable material and stayed in suitable manner to sustain the weight that may be placed upon them. Through the middle of the base of the crank D at $h$ is a hole for inserting the tongue for moving the truck from place to place.

In the rails A is an inverted-V-shaped stop $c$, and to the side of each of the rails C of the platform are pivoted catches G and H. The catch G is pivoted forward of the stop $c$ and the catch H pivoted back of $c$. By means of this construction the platform is sustained in its upright position, preventing it from dropping in either direction.

The combined lever and tongue shown in Figs. 7 and 8 consists of a bar of wood I, to one end of which is bolted a crooked bar of iron $i$ and at the other end also a crooked bar of iron J with a somewhat shorter joint, the object of which will presently appear. The end of the wood part of the tongue does not extend out as far as the hook $i$, but ends abruptly at K, and forms a shoulder, for the purposes presently to appear.

The manner of operating my device is as follows: Starting with the truck in the position as shown in Fig. 2, the truck is run under the stove and the point $i$ of the handle I is run under the crank D, with its shoulder K resting against the base of the said crank D, and turned partially upward, as shown in Fig. 8, carrying with it the platform C, and with it the rear crank E, and when the platform has been brought to its highest position the catches G and H will drop into their respective positions back of the stops $c\ c$ and hold the platform firmly in this position. Then if the article is to be transported the lever I is removed and the end J of the lever I is inserted in the hole $h$ in the crank D, and the truck with the stove thereon can be drawn to any place desired. If it be desired to leave the stove in that position upon the truck, the handle I can be withdrawn and laid underneath the truck out of the way.

It will be seen by this mode of construction that the truck can be reduced to a very slight height perpendicularly and that where large stoves completely cover the truck the handle I can be inserted for raising the platform C as conveniently as though the truck was not so covered. It will also be observed that this truck is a convenient article for use in private dwellings where heating-stoves are taken out in the spring and returned in the fall, the stove remaining upon the truck during the interval.

Having now described my invention, what I claim, and desire to secure by Letters Patent, is—

1. In a stove-truck, a removable combined tongue and lever, consisting of a handle, with hook J, at its outer end and iron bar $i$, secured to the opposite end of said handle in such a manner as to form a shoulder K, in combination with the front link D, provided with a space in said link into which the handle may be inserted to raise and lower said link and a perforation $h$, all combined as and for the purposes shown.

2. A stove-truck consisting of a front and rear crank both pivoted at their upper opposite corners to rails C, the front crank pivoted at its lower opposite corners into the side bars A, and the rear crank terminating in an axle at its lower side, upon which revolve the rear wheels of said truck, side bars A, pivoted at their rear ends to the axle of the rear wheels and curved upward at their front ends, caster-wheels B, pivoted in the front end of the rail A, and the catches H, and G, adapted to engage stops in rails A, all combined as and for the purposes shown.

3. A stove-truck consisting of links D, and E, the link D, provided with the perforation $h$, the rails C, base-bars A, rear wheels F, caster-wheels B, and handle I, with hooks J, and $i$, and shoulder K, all combined to operate substantially as described and shown.

In testimony whereof I affix my signature in presence of two witnesses.

LEON O. WISWELL.

Witnesses:
W. A. OSBORNE,
WM. DEBOLETER.